US009600728B2

(12) United States Patent
Graumann et al.

(10) Patent No.: US 9,600,728 B2
(45) Date of Patent: Mar. 21, 2017

(54) SYSTEM, METHODS, AND APPARATUS FOR IN-VEHICLE FIDUCIAL MARK TRACKING AND INTERPRETATION

(75) Inventors: David L. Graumann, Portland, OR (US); Carlos Montesinos, San Jose, CA (US); Jennifer Healey, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 609 days.

(21) Appl. No.: 13/977,611

(22) PCT Filed: Dec. 29, 2011

(86) PCT No.: PCT/US2011/067821
§ 371 (c)(1),
(2), (4) Date: Jun. 28, 2013

(87) PCT Pub. No.: WO2013/101047
PCT Pub. Date: Jul. 4, 2013

(65) Prior Publication Data
US 2015/0317527 A1 Nov. 5, 2015

(51) Int. Cl.
*G06K 9/80* (2006.01)
*H04N 7/18* (2006.01)
(Continued)

(52) U.S. Cl.
CPC ......... *G06K 9/00832* (2013.01); *B60R 11/04* (2013.01); *G06T 7/204* (2013.01); *H04N 7/18* (2013.01); *G06T 2207/30268* (2013.01)

(58) Field of Classification Search
None
See application file for complete search history.

(56) References Cited

U.S. PATENT DOCUMENTS 6,775,606 B1 * 8/2004 Ertl ................. B60N 2/002
340/426.2
2008/0059027 A1 * 3/2008 Farmer ............ B60R 21/01538
701/45
(Continued)

FOREIGN PATENT DOCUMENTS

KR 10-2010-0047674 A 5/2010
WO 2013/101047 A1 7/2013

OTHER PUBLICATIONS

International Search Report and Written Opinion received for PCT Application No. PCT/US2011/067821, mailed on Sep. 25, 2012, 10 pages.
(Continued)

*Primary Examiner* — William C Vaughn, Jr.
*Assistant Examiner* — Lindsay Uhl
(74) *Attorney, Agent, or Firm* — Eversheds Sutherland (US) LLP

(57) ABSTRACT

Certain embodiments of the invention may include systems, methods, and apparatus for in vehicle fiducial mark tracking and interpretation According to an example embodiment of the invention, a method is provided for executing computer executable instructions by one or more processors. The method includes receiving the one or more images from at least one camera attached to a vehicle; selecting, from the one or more received images, a region of interest associated with an object in the vehicle; identifying fiducial marks within the selected region of interest by comparing the identified fiducial marks with one or more stored fiducial representations; determining, based at least in part on the comparison, spatial information associated with the object or an occupant of the vehicle; and sending information based at least in part on the determined spatial information.

30 Claims, 7 Drawing Sheets

(51) Int. Cl.
*B60R 11/04* (2006.01)
*G06T 7/40* (2006.01)
*G06K 9/00* (2006.01)
*G06T 7/20* (2006.01)

(56) References Cited

U.S. PATENT DOCUMENTS

2009/0195372 A1  8/2009  Aichi et al.
2009/0278915 A1  11/2009  Kramer et al.

OTHER PUBLICATIONS

International Preliminary Report on Patentability and Written Opinion received for PCT Patent Application No. PCT/US2011/067821, mailed on Jul. 10, 2014, 6 pages.

* cited by examiner

SYSTEM, METHODS, AND APPARATUS FOR IN-VEHICLE FIDUCIAL MARK TRACKING AND INTERPRETATION

FIELD OF THE INVENTION

This invention generally relates to tracking patterns with a camera in a vehicle.

BACKGROUND OF THE INVENTION

Modern automobiles are designed with a plethora of in-cabin controls and sensors for receiving input from occupants of a vehicle and/or measuring aspects associated with the vehicle. As automobile designers and engineers develop additional ways to enhance occupant safety and comfort by adding additional controls and sensors to the cabin, the problem of interconnection and console real estate needs to be addressed. There exists needs to simplify console wiring harnesses, reduce bulk, increase reliability, and decrease manufacturing costs.

BRIEF DESCRIPTION OF THE FIGURES

Reference will now be made to the accompanying figures and diagrams, which are not necessarily drawn to scale, and wherein.

DETAILED DESCRIPTION

Figure 1A:
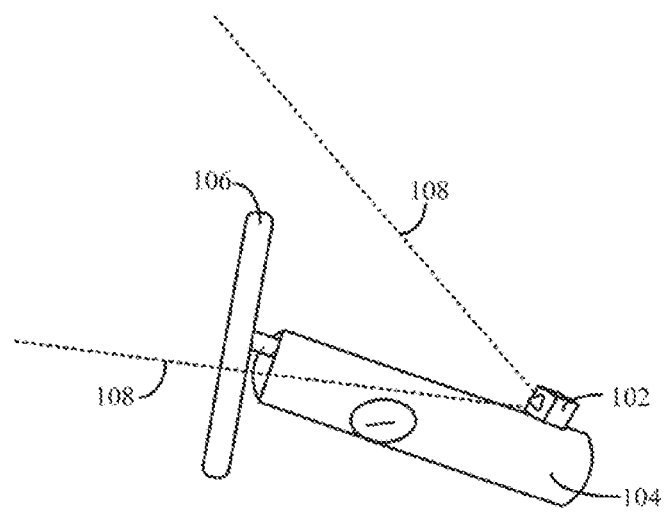
FIG. 1A is a side-view illustration of a cabin-facing camera arrangement according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Certain embodiments of the invention may enable vehicle cabin information to be obtained, tracked, and interpreted using a camera and computer processor system. Example embodiments may include fiducial marks and/or known patterns placed on objects within the vehicle that, when detected by the camera and analyzed, may provide information about items or occupants in the vehicle. For example, a steering wheel may include a pattern of markings that can be detected by a camera and analyzed to determine the angle of the steering wheel. Additional information that may be obtained, according to example embodiments, includes an angular velocity or angular acceleration of the steering wheel. Such information may be utilized, for example, to determine if the driver is attempting to turn the wheel too fast for a given vehicle speed. According to another example embodiment, a steering wheel may include a pattern of markings that can be detected by a camera and analyzed to determine a hand placement on the steering wheel. Such information may be utilized, for example, to provide feedback for increasing safety or functionality.

According to another example embodiment, one or more safety belts within the vehicle may include fiducial markings that can be detected by a camera and analyzed to determine information such as proper use, length, probable driver, etc. Embodiments of the invention may include optically identifiable patterns and/or fiducial markings on other items within the vehicle, such as wiper controls, turn signals, gear shifts, sun roof, windows, doors, seats, etc., that may be monitored by a camera and processed by a computer processor to determine position, rotation, orientation, etc.

Example embodiments of the invention may be utilized to track or measure items associated with the vehicle to determine information associated with the items. Such information, according to an example embodiment, may be used to generate certain commands or output. For example, certain actions may be taken on behalf of an occupant, based on interpreting one or more images. According to an example embodiment, a particular occupant may have an associated preference profile that may include seat and/or mirror configurations.

According to an example embodiment, information such as safety belt length and/or hand placement on the steering wheel may be detected, processed, and interpreted as relating to the particular occupant, and in turn, certain preferences or settings may be automatically configured. According to an example embodiment, the camera and processor system may enhance the driving experience and/or safety in a way that may allow the driver to concentrate on driving rather than being preoccupied with seat settings, etc.

According to an example embodiment, one or more stiffness actuators embedded in a safety belt mechanism may be applied based on information related to the processing of an image. According to an example embodiment, predictive action to facilitate a turn may be based on the image processing and information. According to an example embodiment, a hand gripping on the steering wheel may be identified and/or distinguished from a hand resting on a portion of the steering wheel. According to example embodiments, spatial information related to objects associated with the vehicle may be processed to identify and indicate, for example, poor driving skill, safety belt tension, finger gestures, and other related information.

According to example embodiments, various fiducial marks and/or patterns may be utilized in conjunction with an image capture and processing system, and will now be described with reference to the accompanying figures.

FIG. 1A depicts a side-view illustration of an arrangement that includes a cabin-facing camera 102, according to an example embodiment of the invention. In this example embodiment, the camera 102 may be attached to the steering wheel column 104, and may be configured to image a portion of the steering wheel 106. For example, the camera field of view 108 may include the back of the steering wheel on a side opposite of where a driver may sit in the vehicle. According to an example embodiment, the camera field of view 108 may be configured to image additional portions of the steering wheel 106, the driver, a safety belt, or other items in the vehicle, and will be further discussed below with reference to FIGS. 2 and 5. According to other example embodiments, the camera may be attached or integrated into other portions of the vehicle, such as the dash, the rear-view mirror, slightly above the windshield, or in a convenient place within the console.

Figure 1B:
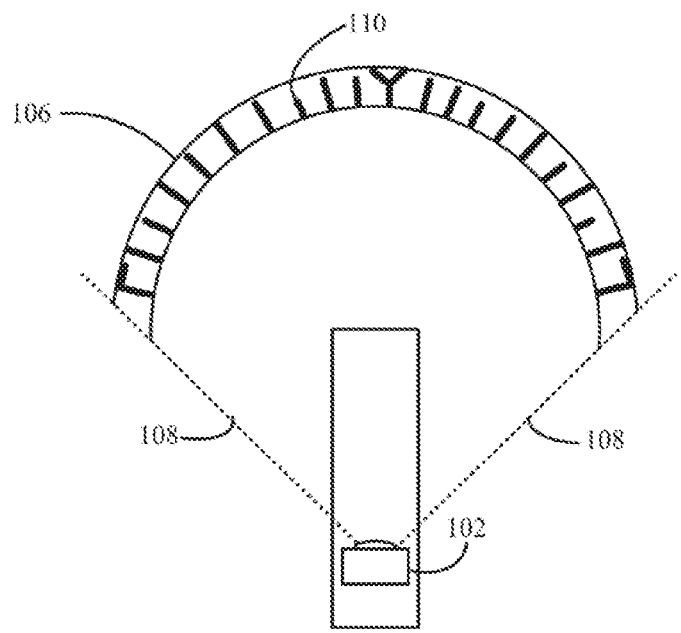
FIG. 1B is an example illustration of fiducial marks on a steering wheel, as viewed from the cabin-facing camera as shown in FIG. 1A, according to an example embodiment of the invention.

FIG. 1B is an example illustration of fiducial marks 110 on the back of the steering wheel 106, as viewed facing the cabin, for example, from a front portion of the vehicle. In this example embodiment, the top half portion of the steering wheel 106, on a side opposite of the driver, may include a series of fiducial marks 110 that may be utilized to uniquely identify the angular position of the steering wheel or the position of the driver's hands. According to an example embodiment, the fiducial marks 110 may be detected with the field of view 108 of the camera 102, and may be distinguished from other portions of the vehicle, for example, by contrast, brightness, color, etc. According to an example embodiment, the fiducial marks 110 may include a reflective material, Which may be illuminated with ambient light, or by a separate light source, to provide adequate image fidelity for distinguishing the marks from non-marked portions of the object.

Figure 2:
FIG. 2 is an example illustration of fiducial marks on a safety belt, according to an example embodiment of the invention.

FIG. 2 is an example illustration of fiducial marks 202 on a safety belt, according to an example embodiment of the invention. According to an example embodiment, a cabin facing camera (such as the camera 102 shown in FIG. 1A or FIG. 1A) may be configured to image at least a portion of the safety belt fiducial marks 202, and the image(s) may be processed to determine the position, length, etc,. associated with the safety belt. Information obtained by processing the images related to the safety belt may then be utilized, for example, to control stiffness or tension of the safety belt, determine a probable identity of the occupant, or provide alerts if the safety belt is not in a correct position.

Figure 3:
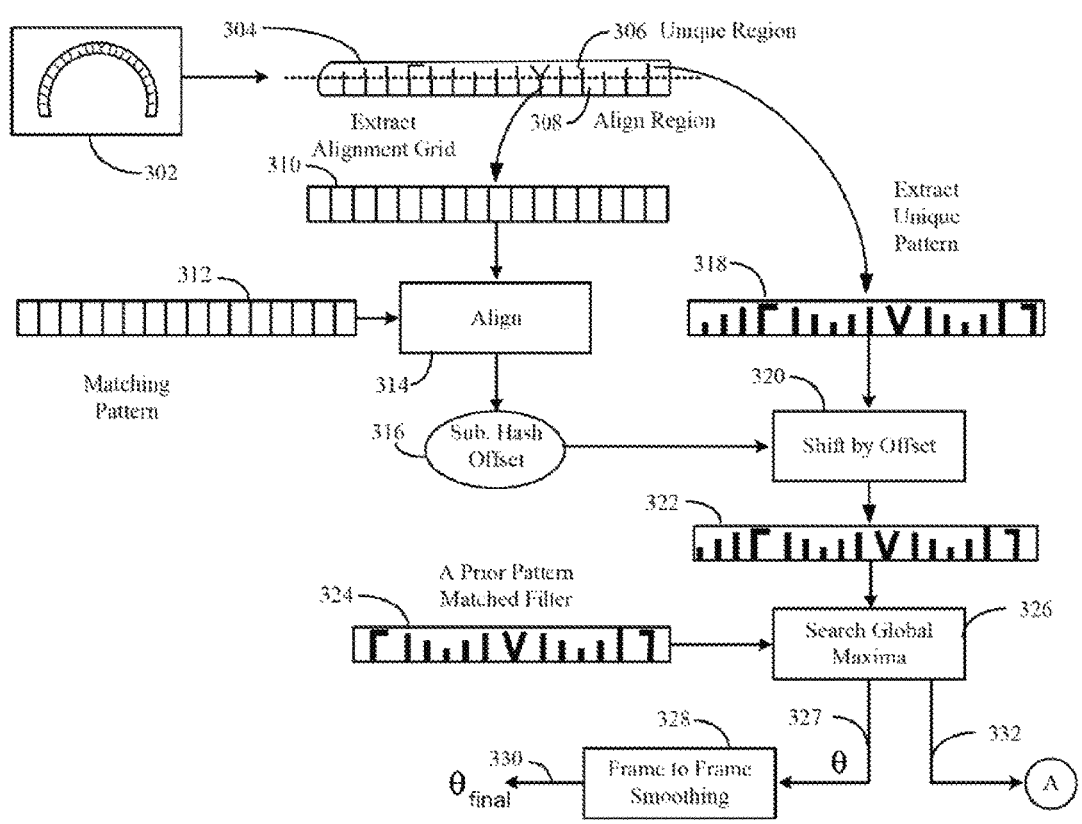
FIG. 3 is a block diagram of an illustrative process for tracking and interpreting information associated with fiducial marks, according to an example embodiment of the invention.

FIG. 3 depicts a block diagram of an illustrative process for tracking and interpreting information associated with fiducial marks, according to an example embodiment of the invention. The blocks may represent imaging and processing associated with fiducial marks located, for example, on an arc portion of a steering wheel image 302. In an example embodiment, a radial-to-linear fiducial mark transformation may be utilized to convert a portion of the steering wheel image 302 to a linear representation 304 of the fiducial marks for ease of processing. According to another example embodiment, the processing may be done entirely in an arc space without transformation. In such a case, the linear version is shown here for clarity. According to an example embodiment, portions of the process as shown in FIG. 3 may also be generalized and used for processing images related to other items in the vehicle marked with fiducial marks or patterns, such as linear (or near-linear) portions of a safety belt or other portions of the steering Wheel. According to an example embodiment, fiducial markings may be applied to a portion of a head rest for determining a comfort position. According to an example embodiments, fiducial markings may be applied to one or more of a seat back, a gear selector, an accelerator pedal, a brake pedal, an emergency brake pedal or lever, a sun visor, a glove compartment, or a door.

Returning to the example depicted in FIG. 3, and according to an example embodiment, a steering wheel image 302 may he captured by a camera, and may be processed to obtain a fiducial mark representation 304. According to an example embodiment, the fiducial mark representation 304 may include a unique region 306, for which the markings may be encoded to uniquely identify the angle, orientation, or position of an object (in this case, the steering wheel angle). According to an example embodiment, the fiducial mark representation 304 may include an align region 308 that may he extracted as an alignment grid 310 and utilized for aligning the steering wheel image 302 or the fiducial mark representation 304 with a matching alignment pattern 312. In an example embodiment, the alignment process 314 may include determining an offset between the extracted alignment grid 310 and the matching alignment pattern 312, In an example embodiment, the offset 316 may be applied to the extracted unique region pattern 318 as a shift process 320 to produce an aligned pattern 322. According to an example embodiment, shifting the extracted unique region pattern 318 by the determined offset 316 may reduce a search space in a searching process 326 for matching the aligned pattern 322, with a prior pattern 324 to determine the angle, orientation, or position of a marked object (in this case, the steering wheel angle, θ327).

According to an example embodiment, the unique region 306 may be related to the align region 308 in a known fashion, so that when the offset 316 is applied in the shift process 320, the resulting marks of the aligned pattern 322 may be better aligned with the prior pattern 324. As indicated above, the offset 316 and shift 320 processes may reduce the computation time and/or search space needed for finding a prior pattern 324 that matches the aligned pattern.

According to an example embodiment, a convolution process may be performed between, for example, the prior pattern 324 and the extracted unique region pattern 318 to determine the angle, orientation, or position of a marked object. In an example embodiment, a correlation may be performed, for example, by using multiplication in Fourier transform-space (or via z-transforms), and a maxima position may be utilized to determine the offset, angle, orientation, or position of a marked object.

According to an example embodiment, a video camera may be utilized to monitor and capture frames of the marked object to determine movement. For example, in the case of the steering wheel as shown in FIG. 3, the movement in the angle θ 327 from frame-to-frame may be tracked and interpolated to provide frame-to-frame smoothing 328 to produce a final angle, $\theta_{final}$ 330.

According to an example embodiment, part of the searching process 326 may include one or more thresholds that may be utilized for determining if a portion of the fiducial mark pattern is occluded. When an occlusion is detected (for example, when a driver has placed hands on the steering wheel), an additional process 332 may be utilized, and will now be discussed with reference to FIG. 4.

Figure 4:
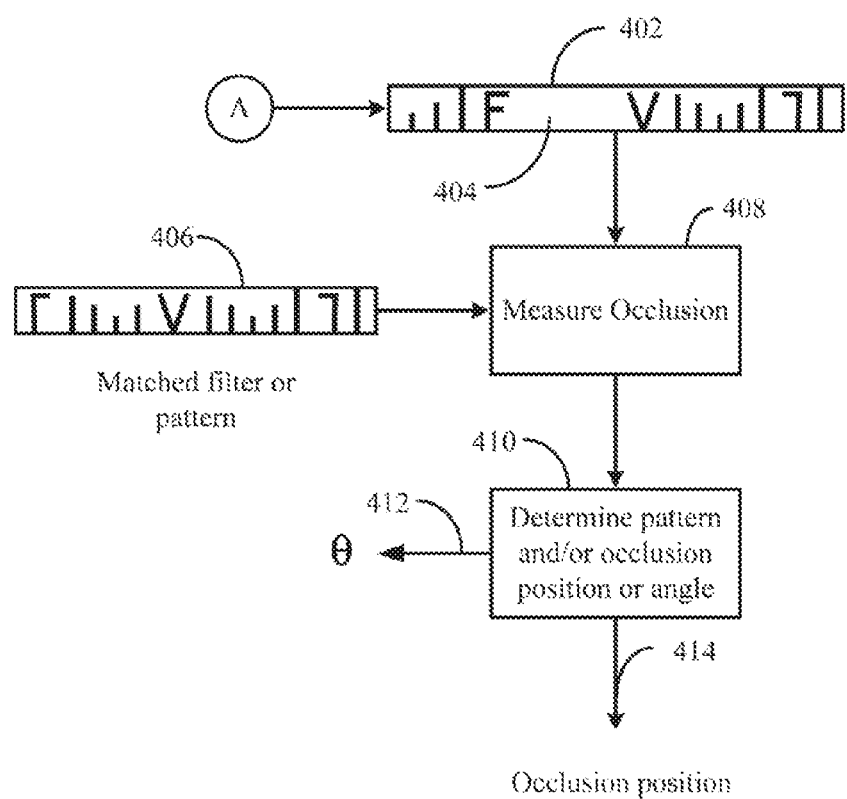
FIG. 4 is a block diagram of an illustrative process for tracking and interpreting information associated with fiducial marks, when a portion of the fiducial mark pattern is occluded, according to an example embodiment of the invention.

FIG. 4 shows a block diagram of an illustrative process for tracking and interpreting information associated with fiducial marks when a portion of the fiducial mark pattern is occluded, according to an example embodiment. In an example embodiment, the occluded and aligned pattern 402 (corresponding to the aligned pattern 322 of FIG. 3) may have a portion 404 of the fiducial mark pattern missing or occluded due to an obstruction (driver's hand, clothing, etc). According to an example embodiment, a matched filter or pattern 406 may be utilized in the measurement of the occlusion 408. In an example embodiment, the measurement of the occlusion 408 may be utilized to determine 410 the offset, angle 412, orientation, or position of a marked object and/or the position of the occlusion 414 with respect to the marked object.

According to an example embodiment, the position of the occlusion 414 with respect to the marked object may be utilized to provide, for example, information about a. driver's hand placement on the steering wheel, and/or whether the hand is in an adequate, optimum, or safe position. Such information may be utilized to determine the driver's driving performance and safety. In certain embodiments, such information may be utilized to provide feedback to the driver for training purposes. In yet other example embodiments, such information may be utilized for modifying control or other functions associated with the vehicle.

Figure 5A:
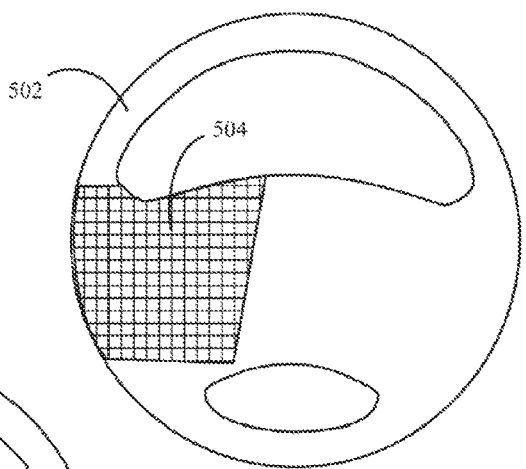
FIG. 5A is an example illustration of a steering wheel, with a portion of the steering wheel having a fiducial mark pattern, according to an example embodiment of the invention.
Figure 5B:
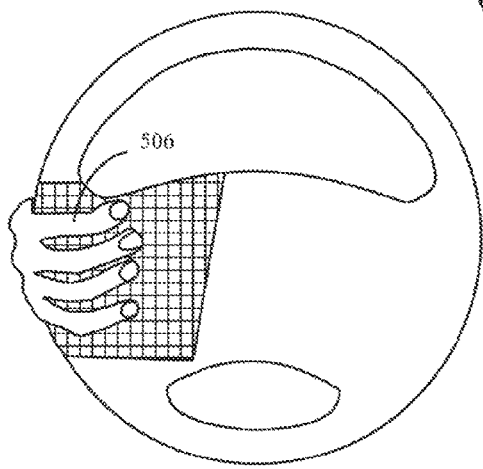
FIG. 5B is an example illustration of the steering wheel of FIG. 5A, with a hand occluding a portion of the fiducial mark pattern, according to an example embodiment of the invention.
Figure 5C:
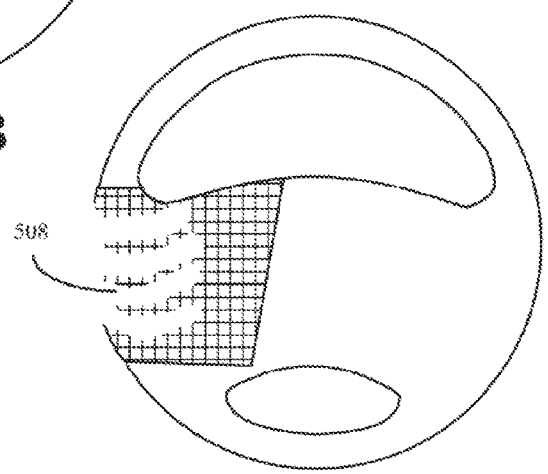
FIG. 5C is an example illustration of the steering wheel of FIG. 5B, showing fiducial mark pattern occlusions, according to an example embodiment of the invention.

FIGS. 5A through 5C depict example illustrations of markings 504 on the back of a steering wheel 502 that may be utilized to determine the position of one or more hands 506 on the steering wheel 502. FIG. 5A depicts an example illustration of non-occluded markings 504 on the steering wheel 502, as may be seen using a cabin-facing camera mounted on or near the dash, or on the vehicle's steering column. The markings 504 may include one or more of a grid, as shown, chirped patterns, or other indicia that may be utilized to distinguish an obstruction and/or the rotation angle of the steering wheel.

FIG. 5B depicts a driver's right hand 506 gripping or resting on the steering wheel 502. According to an example embodiment of the invention, the markings 504 may be included on other portions of the steering wheel 502 to also facilitate determining a position of the driver's left.

FIG. 5C depicts an example illustration of the steering wheel 502 with an occluded region 508 that, for example, may obscure or hide the markings 504 due to the position of a hand 506 or other object on the steering wheel 502.

According to an example embodiment of the invention, a camera (for example, the camera 102 as shown in FIG. 1) may be utilized to receive images corresponding to the portion of the steering wheel 502 opposite of a driver, and the images may be processed to distinguish the regions of the markings 504 that are visible, from the occluded region (s) 508. According to an example embodiment, such information may be utilized to provide, for example, information about a driver's hand placement on the steering wheel 502, and/or whether the hand is in an adequate, optimum, or safe position. Such information may be utilized to determine the driver's driving performance and safety, In certain embodiments, such information may be utilized to provide feedback to the driver for training purposes. In yet other example embodiments, such information may be utilized for modifying control or other functions associated with the vehicle.

Figure 6:
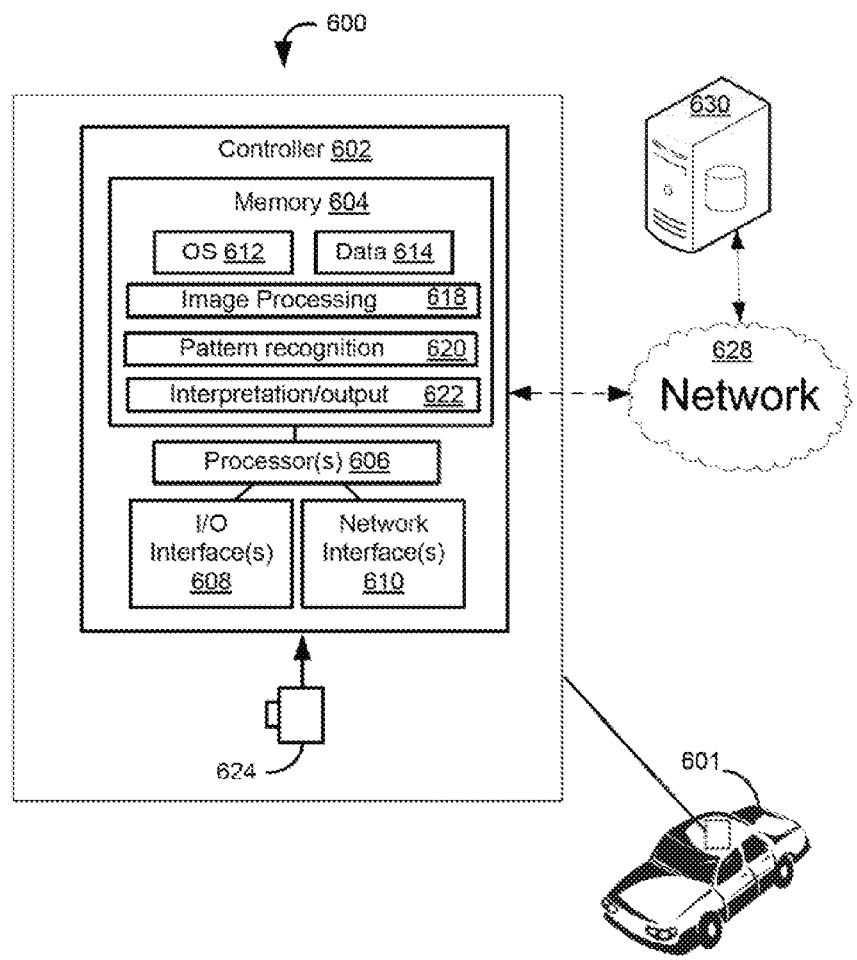
FIG. 6 is a block diagram of an example image processing and interpretation control system, according to an example embodiment of the invention.

FIG. 6 shows a block diagram of an example image processing and interpretation control system 600, according to an example embodiment of the invention. Part of the system 600, including a controller 602 and a camera 624, reside in a vehicle 601. According to an example embodiment, the system 600 may be configured to communicate, for example, with a remote processor/database 630 via a communications network 628.

According to an example embodiment, the controller 602 may include a memory 604. In an example embodiment, one or more processors 606 may be in communication with the memory 604. According to an example embodiment, the controller may include one or more input/output interfaces 608 and/or one or more network interfaces 610 for communication with the one or more processors 606. According to an example embodiment, the one or more processors 606 may communicate with the camera 624 via the one or more input/output interfaces 608 and/or one or more network interfaces 610.

According to an example embodiment, the memory 604 may include an operating system 612 and data 614. According to example embodiments, the memory may include one or more modules for performing image processing 618, performing pattern recognition 620, and/or performing interpretation and providing output 622 based on the image processing 618 and pattern recognition 620. According to example embodiments, the system 600 may be utilized to capture and process images associated with the vehicle 601 via the camera 624, and may provide output (instructions, alerts, commands, etc.) based at least in part on the captured images.

Figure 7:
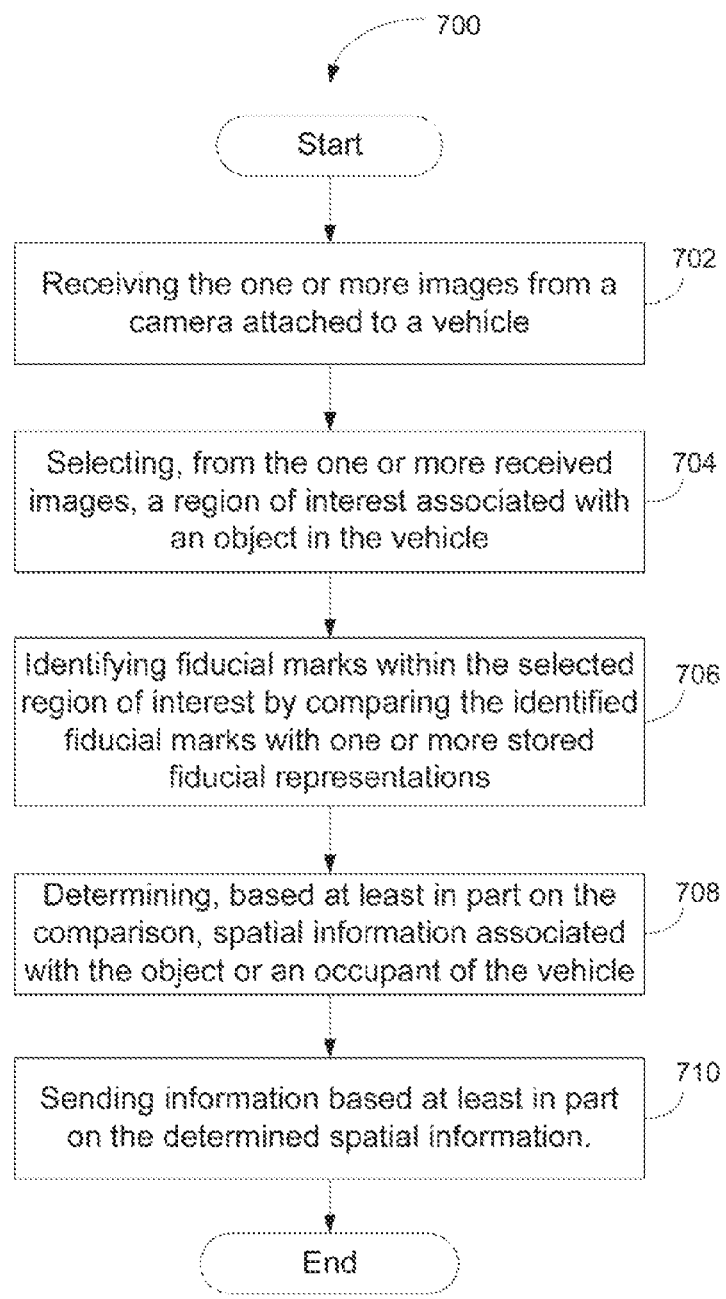
FIG. 7 is a flow diagram of an example method according to an example embodiment of the invention.

FIG. 7 is a flow diagram of an example method 700, according to an example embodiment of the invention. The method 700 may include executing computer-executable instructions by one or more processors. According to an example embodiment, the method 700 may start in block 702, and may include receiving the one or more images from at least one camera. attached to a vehicle. In block 704, and according to an example embodiment, method 700 may include selecting, from the one or more received images, a region of interest associated with an object in the vehicle. In block 706, and according to an example embodiment, method 700 may include identifying fiducial marks within the selected region of interest by comparing the identified fiducial marks with one or more stored fiducial representations. In block 708, and according to an example embodiment, method 700 may include determining, based at least in part on the comparison, spatial information associated with the object or an occupant of the vehicle. In block 710, and according to an example embodiment, method 700 may include sending information based at least in part on the determined spatial information. Method 700 ends after block 710.

According to example embodiments, certain technical effects can be provided, such as creating certain systems, methods, apparatus, and computer-readable media that can detect, interpret, and provide information about the placement, orientation, angle, or configuration of one or more objects within a vehicle. Example embodiments of the invention can provide the further technical effects of providing systems, methods, apparatus, and computer readable media for reading fiducial marks associated with certain. Objects in a vehicle to determine placement of an occupant's hand with respect to one or more objects within the vehicle.

Example embodiments of the invention may include any number of hardware and/or software applications that are executed to facilitate any of the operations. In example embodiments, one or more input/output interfaces may facilitate communication between the image processing and interpretation control system 600 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the image processing and interpretation control system 600. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the image processing and interpretation control system 600 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the image processing and interpretation control system 600 with more or less of the components illustrated in FIG. 1 or FIG. 6.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:
1. A method comprising executing computer-executable instructions by one or more processors for:
  receiving one or more images from at least one camera attached to a vehicle;
  selecting, from the one or more received images, a region of interest associated with an object in the vehicle, wherein the region of interest includes fiducial marks;

determining a fiducial mark representation by using the selected region of interest;

determining an alignment grid from the fiducial mark representation;

determining an offset between the alignment grid and an alignment pattern;

adjusting a portion of the fiducial mark representation using the offset;

identifying at least one occlusion pattern within the selected region of interest by comparing the portion of the fiducial mark representation with one or more stored fiducial representations;

determining, based at least in part on the at least one occlusion pattern, spatial information associated with the object or an occupant of the vehicle; and sending information based at least in part on the determined spatial information.

2. The method of claim 1, wherein the spatial information comprises one or more of: position, angle, orientation, linear velocity, or angular velocity associated with the object.

3. The method of claim 1, wherein the spatial information comprises one or more of hand position, hand grip, hand pressure, hand gesture, driving response, driving accuracy, safety belt tension, body position, body movement, or intent associated with the occupant of the vehicle.

4. The method of claim 1, wherein the fiducial marks comprise an optically identifiable pattern that varies with respect to a frame of reference associated with the object.

5. The method of claim 4, wherein at least a portion of the pattern represents a position or angle associated with the object.

6. The method of claim 1, further comprising estimating the intent of the occupant of the vehicle based at least in part on the determined spatial information.

7. The method of claim 1, wherein selecting a region of interest comprises selecting at least a portion of a steering wheel or at least a portion of a safety belt.

8. The method of claim 1, wherein sending information comprises sending one or more of steering wheel position, steering wheel velocity, hand position on the steering wheel, fingertip location on the steering wheel, safety belt shape, or safety belt position.

9. A vehicle comprising:
at least one camera;
one or more objects comprising fiducial marks that are in a field of view of the at least one camera; and
one or more processors configured for:
  receiving one or more images from the at least one camera;
  selecting, from the one or more received images, a region of interest associated with the one or more objects, wherein the region of interest include fiducial marks;
  determining a fiducial mark representation by using the selected region of interest;
  determining an alignment grid from the fiducial mark representation;
  determining an offset between the alignment grid and an alignment pattern;
  adjusting a portion of the fiducial mark representation using the offset;
  identifying at least one occlusion pattern within the selected region of interest by comparing the portion of the fiducial mark representation with one or more stored fiducial representations;
  determining, based at least in part on the at least one occlusion pattern, spatial information associated with the one or more objects or an occupant of the vehicle; and
  sending information based at least in part on the determined spatial information.

10. The vehicle of claim 9, wherein the one or more objects comprise one or more of a steering wheel or a safety belt.

11. The vehicle of claim 9, wherein the at least one camera is one or more of a visible-light sensitive camera, a visible-light sensitive video camera, an infrared-sensitive camera, or an infrared-sensitive video camera.

12. The vehicle of claim 9, wherein the spatial information comprises one or more of: position, angle, orientation, linear velocity, or angular velocity associated with the one or more objects.

13. The vehicle of claim 9, wherein the spatial information comprises one or more of hand position, hand grip, hand pressure, hand gesture, driving response, driving accuracy, safety belt tension, body position, body movement, or intent associated with the occupant of the vehicle.

14. The vehicle of claim 9, wherein the fiducial marks comprise an optically identifiable pattern that varies with respect to a frame of reference associated with the one or more objects.

15. The vehicle of claim 14, wherein at least a portion of the pattern represents a position or angle associated with the one or more objects.

16. The vehicle of claim 9, wherein the one or more processors are further configured for estimating the intent of the occupant of the vehicle based at least in part on the determined spatial information.

17. The vehicle of claim 9, wherein sending the information comprises sending one or more or steering wheel position, steering wheel velocity, hand position on the steering wheel, fingertip location on the steering wheel, safety belt shape, or safety belt position.

18. An apparatus comprising:
at least one memory for storing data and computer-executable instructions; and
one or more processors configured to access the at least one memory and further configured to execute computer-executable instructions for:
  receiving one or more images from a camera;
  selecting, from the one or more received images, a region of interest associated with one or more objects in a field of view of the camera, wherein the region of interest include fiducial marks;
  determining a fiducial mark representation by using the selected region of interest;
  determining an alignment grid from the fiducial mark representation;
  determining an offset between the alignment grid and an alignment pattern;
  adjusting a portion of the fiducial mark representation using the offset;
  identifying at least one occlusion pattern within the selected region of interest by comparing the portion of the fiducial mark representation with one or more stored fiducial representations;
  determining, based at least in part on the at least one occlusion pattern, spatial information associated with the one or more objects or an occupant of the vehicle; and
  sending information based at least in part on the determined spatial information.

19. The apparatus of claim 18, wherein the one or more objects comprise one or more of a steering wheel or a safety belt.

20. The apparatus of claim 18, wherein the camera is a video camera.

21. The apparatus of claim 18, wherein the spatial information comprises one or more of: position, angle, orientation, linear velocity, or angular velocity associated with the one or more objects.

22. The apparatus of claim 18, wherein the spatial information comprises one or more of hand position, hand grip, hand pressure, hand gesture, driving response, driving accuracy, safety belt tension, body position, body movement, or intent associated with the occupant of the vehicle.

23. The apparatus of claim 18, wherein the fiducial marks comprise an optically identifiable pattern that varies with respect to a frame of reference associated with the one or more objects.

24. The apparatus of claim 23, wherein at least a portion of the pattern represents a position or angle associated with the one or more objects.

25. The apparatus of claim 18, wherein the one or more processors are further configured for estimating the intent of the occupant of the vehicle based at least in part on the determined spatial information.

26. One or more computer-readable media comprising computer-executable instructions that, when executed by one or more processors, configure the one or more processors to:
receive one or more images from a camera;
select, from the one or more received images, a region of interest associated with an object in the vehicle, wherein the region of interest include fiducial marks;
determine a fiducial mark representation by using the selected region of interest;
determine an alignment grid from the fiducial mark representation;
determine an offset between the alignment grid and an alignment pattern;
adjust a portion of the fiducial mark representation using the offset;
identify at least one occlusion pattern within the selected region of interest by comparing the portion of the fiducial mark representation with one or more stored fiducial representations;
determine, based at least in part on the at least one occlusion pattern, spatial information associated with the object or an occupant of the vehicle; and
send information based at least in part on the determined spatial information.

27. The computer-readable media of claim 26, wherein the spatial information comprises one or more of position, angle, orientation, linear velocity, or angular velocity associated with the object.

28. The computer-readable media of claim 26, wherein the spatial information comprises one or more of hand position, hand grip, hand pressure, hand gesture, driving response, driving accuracy, safety belt tension, body position, body movement, or intent associated with the occupant of the vehicle.

29. The computer-readable media of claim 26, wherein the fiducial marks comprise an optically identifiable pattern that varies with respect to a frame of reference associated with the object, wherein at least a portion of the pattern represents a position or angle associated with the object.

30. The computer-readable media of claim 26, wherein the computer-executable instructions further configure the one or more processors to estimate the intent of the occupant of the vehicle based at least in part on the determined spatial information.

* * * * *